United States Patent Office 2,788,793
Patented Apr. 16, 1957

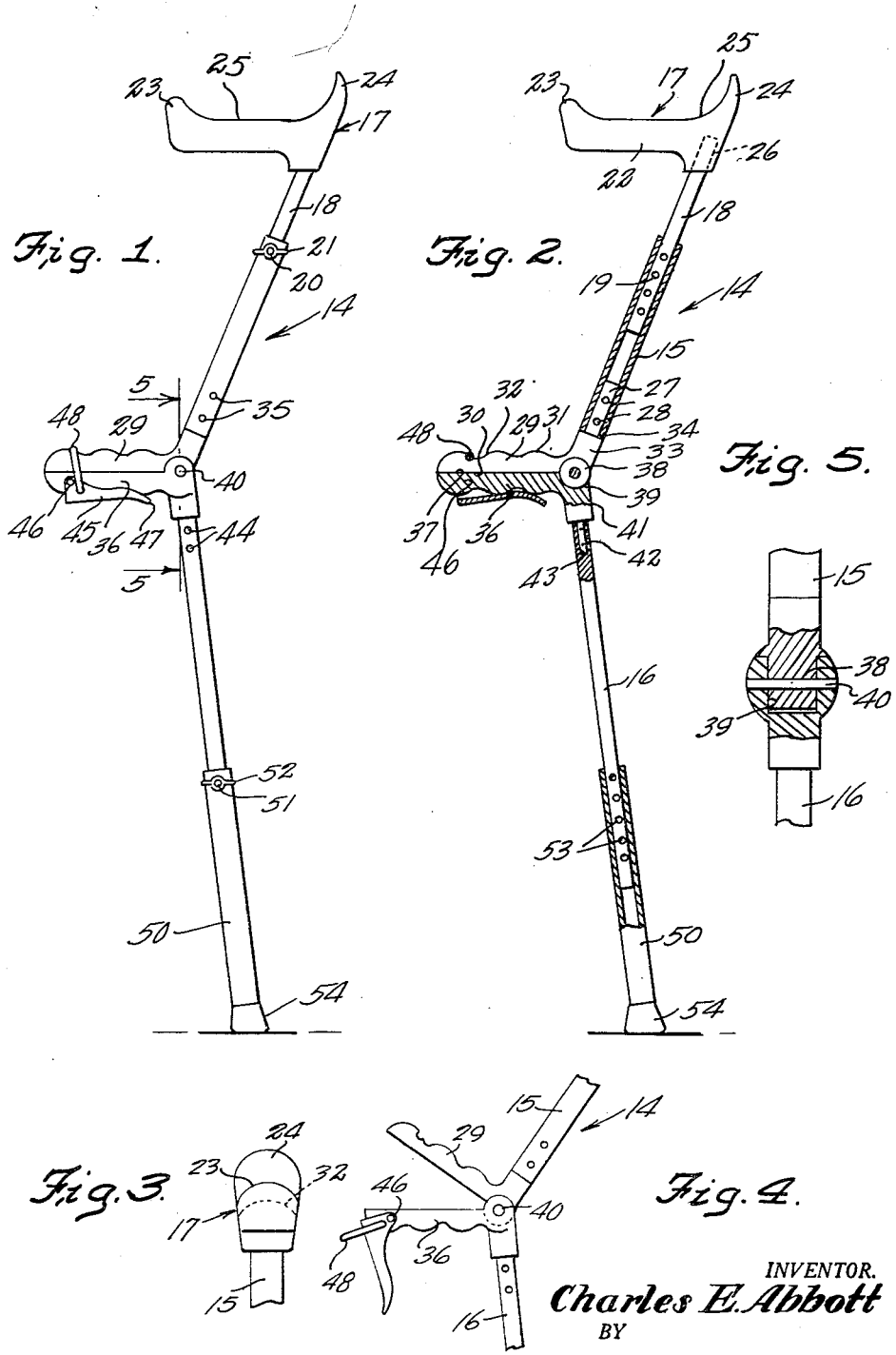

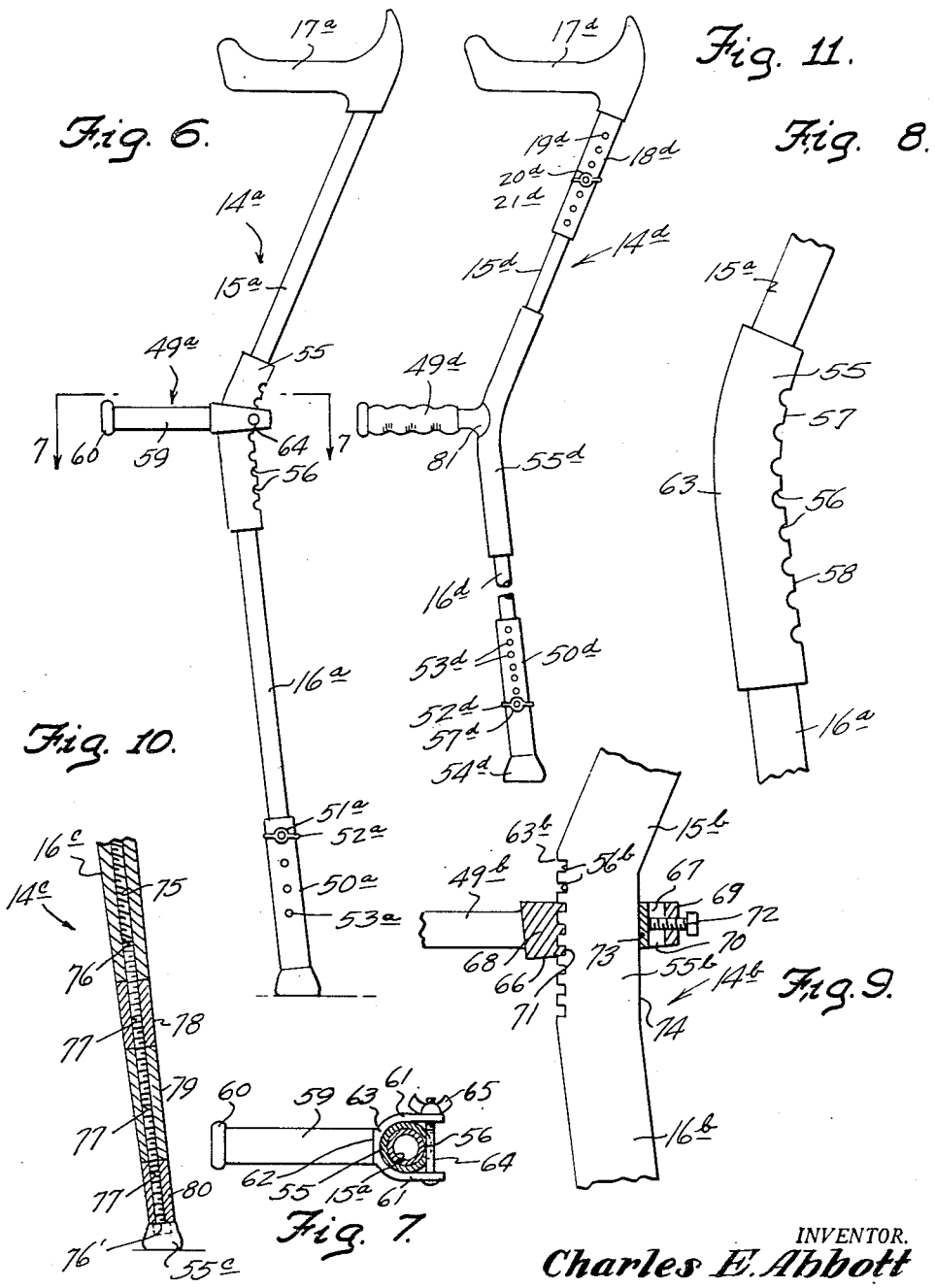

2,788,793
CRUTCH

Charles E. Abbott, Cucamonga, Calif.

Application April 1, 1955, Serial No. 498,717

1 Claim. (Cl. 135—49)

This invention relates to improved crutches of the one-leg type.

The primary object of the invention is to provide novel and improved crutches of the one-leg type which are more convenient and comfortable to use, give the user better and more secure balance in their use, and are more compact and less bulky than other forms of crutches.

Other important objects and advantageous features of the invention will be apparent from the following description and the accompanying drawings, wherein, for purposes of illustration rather than limitation, specific embodiments of the invention are set forth in detail.

In the drawings:

Figure 1 is a side elevation of one embodiment;

Figure 2 is a view similar to Figure 1, partly broken away to show internal structure;

Figure 3 is a fragmentary end elevation of the shoulder rest;

Figure 4 is a fragmentary side elevation showing the leg sections in partially folded relation;

Figure 5 is an enlarged fragmentary transverse vertical section taken on the line 5—5 of Figure 2;

Figure 6 is a side elevation of another embodiment, with phantom lines indicating another angulation of the leg produced by adjustment of the handle;

Figure 7 is an enlarged horizontal section taken on the line 7—7 of Figure 6;

Figure 8 is an enlarged fragmentary elevation, partly in section, of the middle part of the leg without the associated handle;

Figure 9 is a fragmentary side elevation, partly in section, of another embodiment of the invention;

Figure 10 is a fragmentary transverse vertical section taken through the lower leg section of a further embodiment of the invention; and, Figure 11 is a contracted side elevation of a still further embodiment of the invention.

Referring in detail to the drawings, wherein like or similar numerals designate like parts throughout the several views, and first to Figures 1 through 5 thereof, the improved crutch therein shown is generally designated 14.

The crutch 14 comprises a tubular upper leg section 15 and a solid lower leg section 16.

A shoulder rest 17 comprises a solid depending shank 18 which is slidably inserted in the upper end of the tubular upper leg section 15 and has a row of longitudinally spaced holes 19 therein to pass a bolt 20 which traverses an upper part of the section 15 and has thereon a wing nut 21. The shoulder rest 17 is vertically adjustable by withdrawing the bolt 20, setting the shank 18 at the desired height and inserting the bolt 20 in the proper one of the holes 19.

The shoulder rest 17 comprises a shoulder rest member 22 which is horizontally elongated, has a forward and upwardly inclined stop 23 in its forward end, and an upwardly and rearwardly curved horn 24 on its rearward end; the horn 24 is spoon-shaped in contour, and the upper surface 25 between the stop 23 and the horn 24 is convexly rounded. The upper end of the shank 18 is inserted in and secured in a socket 26 in the underside of the shoulder rest 17 in line with the horn 24.

Inserted in the lower end of the upper leg section 15 is a shank 27 having a row of holes 28 therethrough. The shank 27 projects upwardly at a rearward angle from the rearward end of a horizontal upper handle section 29.

The upper handle section 29 has a flat underside 30 and a rounded upper side 31 which includes longitudinally spaced valleys 32 which increase the security and comfort of the hand of the user thereon. The upper handle section 29 further includes an upwardly and rearwardly angulated terminal 33 on its rear end which is larger in diameter than the shank 27 and therewith defines a shoulder 34 against which the lower end of the leg section 15 abuts. Pins 35 traversing the leg section 15 and the shank holes 28 secure the upper handle section 29 to the leg section 15.

A lower handle section 36 is substantially similar to but reversed with respect to the upper handle section 29, with its flat upper side 37 registered with and engaged with the flat underside 30 of the upper handle section 29 in the extended position of the leg sections 15 and 16.

At its rearward end the upper handle section 29 has a circular lug 38 which projects into a notch 39 in the rearward end of the lower handle section 36, as shown in Figures 2 and 5, and a pivot pin 40 extends therethrough, so as to pivot the leg sections 15 and 16 together.

The depending and rearwardly angulated terminal 41 of the lower handle section has an aligned reduced shank 42 which is inserted in a socket 43 in the upper end of the solid lower leg section 16 and secured in place by pins 44.

For releasably securing the handle sections together, a locking lever 45 of concavo-convex cross section is pivoted at one end as indicated at 46 to the forward part of the lower handle section 36 and has a free end 47. In the closed position of the handle sections, shown in Figures 1 and 2, the lever 45 conformably engages and lies along the underside of the lower handle section 36. Pivoted to the lever 45 near its forward end is a locking ring 48 which encircles the handle sections in their closed positions and holds the handle sections securely engaged with each other. When the free end 47 of the lever 45 is swung downwardly from the locking position, the ring 48 is loosened on the handle sections 29 and 36 and can be withdrawn over the forward ends thereof, so as to free the leg sections 15 and 16 to be folded into side by side position.

When the handle sections 29 and 36 are locked together, the leg sections 15 and 16 are at such an angle to each other that the lower end of the lower leg section is beneath the shoulder rest 17 and the handle 49 defined by the handle sections is set forwardly from both the shoulder rest and the heel of the crutch.

Telescoped on the lower end of the lower leg section 16 is a vertically adjustable tubular heel member 50 which is traversed at its upper end by a bolt 51 which has a wing nut 52 thereon, the bolt 51 being extended through a selected one of a row of holes 53 provided in the lower part of the leg section 16. On the lower end of the heel member 50 is a cushion tip 54.

Referring now to Figures 5 to 8 of the drawings, the modified crutch therein shown and generally designated 14a is not collapsible or folded. The crutch 14a comprises a tubular non-adjustable upper leg section 15a having thereon a shoulder rest 17a similar to that described above, a solid lower leg section 16a having on its lower end a tubular adjustable heel member 50a provided with a row of holes 53a therein selectively traversed by a bolt 51a which traverses the leg section 16a and has a wing nut 52a. The leg sections 15a and 16a are rigidly connected together by a handle structure which includes a bent sleeve 55 into whose opposite ends the adjacent ends of the leg sections are inserted and secured, the leg sections 15a and 16a being angulated like the leg sections of the above described embodiment.

On its rear side the sleeve 55 has a row of vertically spaced notches 56 which extends along the oppositely angulated areas 57 and 58.

A handle 49a comprises an elongated element 59 having a knob 60 on its forward end and having a clevis on its rearward end involving arms 61, 61 which are positioned against opposite sides of the bent sleeve 55, with the bight portion 62 of the clevis engaging the front side 63 of the sleeve 55. A clamping bolt 64 traverses the arms 61, 61 and engages the back surface of the sleeve 55 and includes a wing nut 65. When the bolt 64 is loosened, the clevis can be moved along the sleeve 55 to place the bolt 64 in a selected one of the notches 56 so as to give the desired angularity of the handle 49a to the leg sections 15a and 16a and thereby determine the point at which the heel member 50a will engage the ground relative to the shoulder rest 17a. To lock the adjustment of the handle 49a the bolt 64 is tightened.

Referring now to the embodiment shown in Figure 9, and generally designated 14b, the upper and lower leg sections 15b and 16b, respectively, are rigidly connected together by a preferably integral prolongation 55b thereof, the angulation of the leg sections being as described hereinabove.

The prolongation 55b is straight and cylindrical and has a forward side 63b provided with vertically spaced horizontal notches 56b.

The handle 49b has an enlargement 66 on its rearward end which has therein an opening 67 which defines a forward member 68, a rearward member 69, and spaced side members 70, the prolongation 55b being freely extended through the opening 67. The forward member 68 has teeth 71 thereon for engaging in the notches 56b. A bolt 72 is threaded through the rear member 69 and carries, within the opening 67, an abutment 73 which is engaged with the rear side 74 of the prolongation 55b so as to hold the teeth 71 engaged in selected ones of the notches 56b, the handle 49b being thereby in a selected vertically adjusted position.

Referring now to the embodiment of the invention shown in Figure 10 of the drawings, and generally designated 14c, the lower leg section 16c thereof has a threaded axial bore 75 into which is threaded the upper part of a bolt 76 having a head 76' on its lower end. The bolt 76 also passes through bores 77 and spacers 78, 79 and 80, respectively, whose removal or addition adjusts the length of the lower leg section 16c. The bolt head 76 is secured in a cushion tip 55c which engages the lowermost of the spacers.

The embodiment of the invention shown in Figure 11, and generally designated 14d has upper and lower leg sections 15d and 16d which are fixed in the ends of a bent sleeve 55d. The shoulder rest 17d, which is like these described hereinabove, has thereon a sleeve 18d which is telescoped on the upper leg section 15d and is provided with a row of holes 19d through which is removably and selectively extensible a bolt 20d having a wing nut 21d.

Telescoped on the lower leg section 16d is a tubular heel member 50d having a row of holes 53d through which is selectively extensible a bolt 51d having a wing nut 52d thereon.

The handle 49d is fixed to the front side of the bent sleeve 55d, as indicated at 81 and extends at right angles thereto.

What is claimed is:

A one-leg crutch comprising an upper leg section, a lower leg section, said sections having upper and lower ends, a shoulder rest mounted on the upper end of the upper leg section, a heel member mounted on the lower end of the lower leg section, means connecting the lower end of the upper leg section to the upper end of the lower leg section, the upper leg section being angled toward one side of the lower leg section, handle means secured to said connecting means and projecting therefrom in a direction away from said one side of the lower section, said handle means comprising pivot means pivotally traversing and connecting the lower end of the upper leg section and the upper end of the lower leg section, and a handle member which includes upper and lower registering handle sections projecting laterally from the leg sections, and locking means mounted on one of the handle sections and engageable with the other handle section for locking the handle sections in engagement with each other.

References Cited in the file of this patent
UNITED STATES PATENTS

| | | |
|---|---|---|
| 869,128 | Autenrieth | Oct. 22, 1907 |
| 870,400 | Wick | Nov. 5, 1907 |
| 1,192,290 | Engstrom | July 25, 1916 |
| 2,408,604 | Brickson | Oct. 1, 1946 |
| 2,516,852 | Burry | Aug. 1, 1950 |
| 2,568,654 | Neptune | Sept. 18, 1951 |
| 2,575,681 | Peters | Nov. 20, 1951 |
| 2,630,128 | Slater | Mar. 3, 1953 |
| 2,696,826 | Davies | Dec. 14, 1954 |